United States Patent [19]

Pool

[11] Patent Number: 4,572,332
[45] Date of Patent: Feb. 25, 1986

[54] SPEEDOMETER CABLE LUBRICATION TOOL

[75] Inventor: James L. Pool, Clarinda, Iowa
[73] Assignee: Lisle Corporation, Clarinda, Iowa
[21] Appl. No.: 620,805
[22] Filed: Jun. 14, 1984
[51] Int. Cl.$^4$ ............................................. F16N 21/00
[52] U.S. Cl. .................................. 184/15.1; 184/105.1
[58] Field of Search ................. 184/15.1, 15.3, 105 R, 184/105 B, 105 C

[56] References Cited

U.S. PATENT DOCUMENTS 4,415,064 11/1983 Oliemuller ...................... 184/105 R

FOREIGN PATENT DOCUMENTS 221078 5/1942 Switzerland ....................... 184/15.1

Primary Examiner—Leonard E. Smith
Attorney, Agent, or Firm—Allegretti, Newitt, Witcoff & McAndrews, Ltd.

[57] ABSTRACT

Cable lubricator tool for lubricating a drive cable of a speedometer includes an adapter for attachment to the speedometer cable housing, a drive shaft extending through the adapter and connectable to the cable; a lubricant reservoir connected with an annular chamber surrounding the drive shaft. The lubricant chamber may be pressurized forcing lubricant through the annular chamber into the cable housing while the drive shaft may be rotated to effectively rotate the cable as lubricant is being forced into the housing surrounding the cable.

3 Claims, 3 Drawing Figures

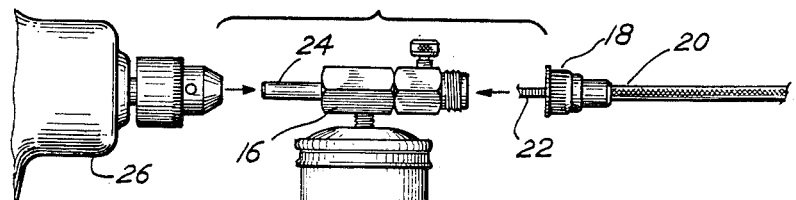
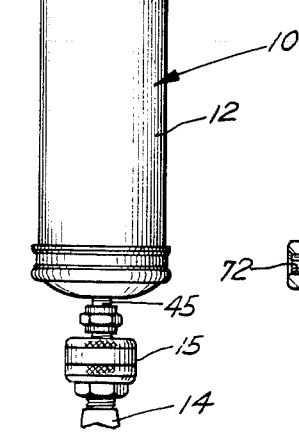
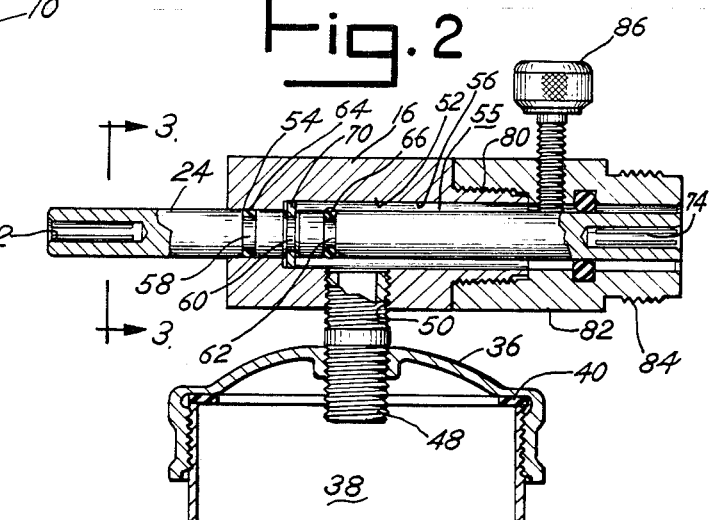
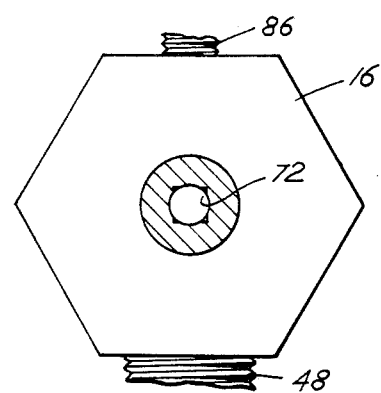
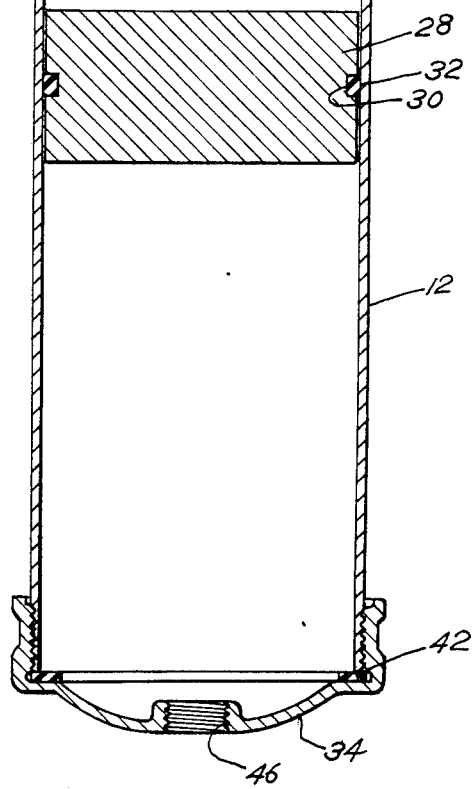

SPEEDOMETER CABLE LUBRICATION TOOL

BACKGROUND OF THE INVENTION

This invention relates to a tool which is especially useful for the lubrication of a speedometer cable.

Typically an automobile speedometer cable will connect from the transmission housing of an automobile to the speedometer located on the dashboard of the automobile. The cable is normally enclosed within a cable housing. The cable is driven by the transmission at a rate proportional to the speed of the vehicle and therefore rotated within the cable housing to transmit an indication of the speed to the speedometer. The cable housing generally includes a lubricant so that the cable may rotate within the housing without generating friction, heat or noise. However, the lubricant may drain or otherwise need to be replaced. Thus, it is often necessary to replace or reinsert lubricant within the cable housing to surround the speedometer cable.

Heretofore, numerous suggestions have been made with respect to tools for placing lubricant into a cable housing. For example, special grease gun attachments have been devised which will cooperate with a speedometer cable that has been removed from its transmission connection. The grease gun is then operated to force lubricant into the cable housing. Because of the constricted dimensions of the cable housing and the cable, complete and efficient distribution of lubricant in the manner described does not always result. Thus, there has been a need for an improved tool for the addition of lubricant in a cable housing for a speedometer or other drive cable.

SUMMARY OF THE INVENTION

Briefly, the present invention of a cable lubrication tool for lubricating a rotatable drive cable encased within a cable housing comprises an adapter with a throughbore therein having a coaxial cable drive shaft in the throughbore. The drive shaft is connectable to an electric drill, for example at one end, and is designed to engage with a drive or speedometer cable at its opposite end. An annular space is provided around the drive shaft and a lubricant source is connected with this annular space or cavity. The lubricant source provides lubricant under pressure to that cavity and thus to a cable housing which is also attached to the adapter. Typically, the lubricant source is a housing connected to a pneumatic pressure source to effect pressurization and thus movement of the lubricant. In operation lubricant under pressure is introduced into the cable housing while the cable itself is simultaneously rotated or driven by means of an electric drill device or the like. In this manner, lubricant is forced into the cable housing under pressure and simultaneously agitated, stirred and mixed so as to enhance the movement of the lubricant into the cable housing to a maximum extent.

Thus, it is a object of the present invention to provide an improved cable lubrication tool for introducing lubricant into a cable housing to encircle a rotatable drive cable in the housing.

It is a further object of the present invention to provide a lubrication tool which can be easily utilized with existing automobile speedometer cables, for example.

Still another object of the invention is to provide a lubrication tool for lubricating speedometer cables associated with an automobile or other vehicle wherein the mechanism is designed to operate the speedometer cable while simultaneously injecting lubricant into the cable housing.

A further object of the invention is to provide a cable lubrication tool having the capability of cooperating with numerous types of speedometer cables or other cable assemblies.

Still a further object of the invention is to provide a cable lubrication tool which has a simple construction utilizing a minimum number of parts and which is easy to use and easy to manipulate.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a plan view illustrating the improved tool of the invention as it is designed to cooperate with an electric drill, a pneumatic pressure source, and a speedometer cable and cable housing for a vehicle;

FIG. 2 is a plan cross-sectional view of the improved tool of the present invention; and FIG. 3 is an end cross-sectional view taken substantially along the line 3—3 in FIG. 2.

DESCRIPTION OF THE PREFERRED EMBODIMENT

Referring first to FIG. 1, the improved tool 10 of the present invention includes a lubricant reservoir or tube 12 which is connected to an airline or pneumatic pressure source 14 via a connector 15. Air from the airline 14 drives a piston 28 within the tube 12 to discharge lubricant into an adapter 16. The adapter 16 is connected to a fitting 18 associated with a cable housing 20. Thus lubricant can flow through the adapter 16 into the interior of the housing 20 to surround a speedometer cable 22. The speedometer cable 22 is attached to a drive shaft 24 that extends through the adapter 16. The shaft or driver 24 is, in turn, connected to an electric drill 26 and rotates the cable 22 as lubricant is fed into the housing 20. The further operation of the tool 10 will be described in greater detail below subsequent to a review of the specific construction of the tool 10.

The tool 10 is illustrated in FIGS. 2 and 3 in greater detail. Referring to these Figures, the tube or cylinder 12 includes a piston 28 which has a circumferential groove 30 that receives an O-ring 32 to seal the piston 28 against the interior sides of the tube 12. The piston 28 is free to move in the longitudinal direction within the tube 12 between the opposite ends or caps 34 and 36 which are screw-fitted onto the tube 12. The piston 28 thus forms a cavity or chamber 38 between the end cap 36 and the piston 28 for receipt of a lubricant material. The cap 36 may be removed from the tube 12 in order for lubricant material to be placed within the cavity 38. Of course, the size of the cavity 38 is dependent upon the position of the piston 28. When filling the tube 12, the piston 28 is adjacent the cap 34. Note that each cap 34 and 36 is sealed with the tube 12 by virtue of ring seals 40 and 42, respectively.

The cap 34 includes a center passage 44 for receipt of a nipple connector 45 in FIG. 1 to which the pneumatic connector 15 and line 14 may be connected. In this manner air pressure may be provided against a face of the piston 28 to drive that piston against the material or lubricant in the chamber 38. The opposite end cap 36 includes a fitting or double-ended threaded nipple 48 which extends from the chamber 38 and connects through a threaded passage 50 in the adapter 16.

The adapter 16 includes a throughbore 52 having a lesser diameter section 54 and a greater diameter section 56. The passage 50 connects to the greater diameter section 56. A driver stem or shaft 24 has a diameter substantially equal to the diameter of the lesser diameter section 54 and slidably and rotatably fits into the section 54. Shaft 24 defines an annular lubricant passage 55 in the greater diameter throughbore section 56.

The construction of the shaft 24 is of special significance. The shaft 24 is substantially of uniform diameter but includes three circumferential grooves 58, 60, and 62. Elastomeric O-rings 64 and 66 fit into grooves 58 and 62 respectively to provide a seal when the appropriate part of the shaft 24 is fitted through the lesser diameter section 54. A circular washer 70 fits in the groove 60 and acts as a shoulder or flange to fit against the bottom of the greater diameter section 56 and limit translational movement of the shaft 24 within the throughbore 52. The shoulder or washer 70 is positioned at an unequal distance from the opposite ends of the shaft 24. The shaft 24 is reversible in the passage 52 of adapter 16.

The reversibility feature of the shaft 24 comes into play when a supplemental adapter 82 is threaded onto outside threaded fitting 80 of the adapter 16. That is, the supplemental adapter 82 acts to extend the effective length of the adapter 16, but more importantly includes a threaded fitted end 84 which is adapted to cooperate with a different size of fitting 18 associated with a cable housing 20. It is desirable in the operation of the device to have the shaft 24 extend substantially to the outer end of the adapter. For this reason the shaft 24 is reversible and sized to extend to the end of the throughbore 52. Thus, in the configuration as shown in FIG. 2, the greater length of the shaft 24 from the shoulder 70 is provided so that the shaft 24 will extend to the full extension of the supplemental adapter 82. If the supplemental adapter 82 is removed, then the shaft 24 will likewise be reversed in its position so that the shorter dimension of the length of the shaft 24 will be positioned in the adapter 16.

The opposite ends of the shaft 24 each have a shaped counterbore 72 and 74, respectively for receipt of the speedometer cable or drive cable 22 shown in FIG. 1. The counterbore 72 and 74 are keyed to receive the cable so that when the shaft 24 is rotated, the cable 22 will likewise be rotated.

A thumb screw 86 is also provided in the supplemental adapter to tighten down against an unthreaded fitting 18 which may be utilized in association with a cable housing. Thus, if the speedometer cable assembly has fittings of various sizings, the tool of the present invention can be altered to cooperate with such fittings. Additionally, if the fitting is unthreaded, the thumbscrew 86 will hold the cable fitting 18 or housing 20 in a fixed position while the cable 22 itself is being turned or rotated in response to the driving force provided by an electric drill 26 or the like.

In operation, the speedometer cable fitting 18 is detached from a transmission housing associated with the vehicle. The fitting 18 is thus screwed on or otherwise attached to the adapter 16 or supplemental adapter 82 and the speedometer cable 22 is itself keyed to the shaft or stem 24. An electrical drill 26 is usually operated in the reverse direction after the chuck of the drill is attached to the shaft 24. The air line is connected to the tube 12 in the manner previously described and the drill 26 is operated generally for four to eight minutes in order to properly lubricate a speedometer cable.

With the use and operation of the present invention, it is possible to lubricate speedometer cables in an effective way so as to eliminate disconcerting noise, chattering or friction associated with the operation of the speedometer. In order to reattach the speedometer cable assembly, the air line 14 is first disconnected from the tool. The drill 26, of course, is turned off and then disconnected.

It is possible that the tool of the present invention may be used with other types of cables enclosed in a cable housing. A speedometer cable has been described merely as illustrative. Thus, the invention is limited only by the following claims and their equivalents.

What is claimed is:

1. A cable lubricator tool for lubricating a rotatable drive cable within a cable housing comprising, in combination:

an adapter having a throughbore for lubricant flow and also having connecting means for attachment to a drive cable housing;

a lubricant storage tube with a translatable piston in the tube, said piston defining a lubricant chamber in the tube;

a lubricant flow connection from the tube chamber to the throughbore of the adapter housing;

a cable drive shaft extending through a sealed passage in the adapter and into the throughbore for attachment to a drive cable, said shaft and throughbore defining a passage for lubricant flow into an attached cable housing;

means for attaching the drive shaft for rotating the shaft and an attached drive cable;

said adapter throughbore having a lesser diameter bearing passage which is coaxial with a lubricant passage, and said drive shaft comprising a cylindrical shaft member having substantially the same diameter as the bearing passage and rotatable in the bearing passage, one end of said shaft member projecting from the adapter for attachment with drive means and the opposite end of said shaft member projecting into the lubricant passage and including means for attachment to a drive cable;

said shaft member also including a shoulder intermediate its ends to limit translation of the shaft through the bearing passage and maintain the shaft in a substantially non-translatable position when the tool is attached to a drive cable and associated housing;

said shaft member having a substantially uniform diameter and being reversibly positionable in the throughbore, said shoulder being an unequal distance from each end of the shaft to thereby accommodate distinct sizes of drive cable assembly by reversal of the shaft in the adapter whereby the piston is translatable in the chamber to compress lubricant in the chamber and transfer lubricant from the chamber into the throughbore of the adapter housing and thus into the drive cable housing attached to the adapter as the drive cable is rotated.

2. The tool of claim 1 wherein the tube is generally cylindrical with caps at its opposite ends and the piston is free in the cylinder, and wherein one cap receives the lubricant flow connector to the chamber and the other cap receives a connector for attachment to a fluid pressure source.

3. The tool of claim 1 including a supplemental adapter attachable to the adapter, said supplemental adapter having a throughbore extension and also cooperative to engage a drive cable housing.

* * * * *